United States Patent
Kanehara et al.

(10) Patent No.: US 9,255,589 B2
(45) Date of Patent: Feb. 9, 2016

(54) HYDRAULIC PRESSURE SUPPLY APPARATUS FOR AUTOMATIC TRANSMISSION

(71) Applicant: HONDA MOTOR CO., LTD., Tokyo (JP)

(72) Inventors: Shigeru Kanehara, Wako (JP); Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 14/108,506

(22) Filed: Dec. 17, 2013

(65) Prior Publication Data
US 2014/0174570 A1    Jun. 26, 2014

(30) Foreign Application Priority Data

Dec. 21, 2012 (JP) .................................. 2012-280148

(51) Int. Cl.
| F16H 59/00 | (2006.01) |
| F16H 61/00 | (2006.01) |
| F16H 63/00 | (2006.01) |
| F16H 9/00 | (2006.01) |
| F15B 15/20 | (2006.01) |

(52) U.S. Cl.
CPC ............... *F15B 15/20* (2013.01); *F16H 61/00* (2013.01); *Y10T 137/86027* (2015.04)

(58) Field of Classification Search
CPC ............ F16H 61/66272; F16H 61/66259; F16H 61/12; Y10T 477/624; Y10T 477/6242
USPC ....................................................... 474/28, 69
See application file for complete search history.

(56) References Cited

U.S. PATENT DOCUMENTS

| 4,387,608 | A | * | 6/1983 | Mohl | ............... F16H 61/66259 474/12 |
| 4,628,773 | A | * | 12/1986 | Itoh | ........................ B60W 30/18 474/28 |
| 4,642,069 | A | * | 2/1987 | Sawada | ................ F16H 61/662 474/28 |
| 4,702,725 | A | * | 10/1987 | Kouno | ............. F16H 61/66259 474/18 |
| 4,714,451 | A | * | 12/1987 | Yoshida | ............ F16H 61/66259 474/28 |
| 4,753,627 | A | * | 6/1988 | Kawamoto | ................ F16H 9/12 474/18 |
| 4,764,156 | A | * | 8/1988 | Ohkumo | ........... F16H 61/66259 474/28 |
| 4,772,249 | A | * | 9/1988 | Kouno | ................. B60W 30/18 474/28 |
| 4,778,435 | A | * | 10/1988 | Sugaya | ................. B60W 30/18 474/18 |

(Continued)

FOREIGN PATENT DOCUMENTS

JP     2005-337502 A     12/2005

*Primary Examiner* — Henry Liu
(74) *Attorney, Agent, or Firm* — Squire Patton Boggs (US) LLP

(57) ABSTRACT

In a hydraulic pressure supply apparatus for an automatic transmission having hydraulic pressure supply destinations comprising at least three hydraulic actuators different from one another in required hydraulic pressure and a lubrication system, there are provided with at least three, actually five, hydraulic pumps, at least three, actually five, regulator valves capable of regulating hydraulic pressures delivered from the hydraulic pumps to values corresponding to the respective required pressures to be supplied to the hydraulic pressure supply destinations, and the selector valves installed between the hydraulic pumps and the regulator valves, wherein the operation of the selector valves is controlled to connect the hydraulic pumps to the regulator valves in accordance with the flow rates required by five hydraulic pressure supply destinations comprising the hydraulic actuators and the lubrication system.

11 Claims, 10 Drawing Sheets

(56) References Cited

U.S. PATENT DOCUMENTS

| | | | | |
|---|---|---|---|---|
| 4,809,564 A * | 3/1989 | Sakai | B60W 10/02 | 192/3.56 |
| 4,857,034 A * | 8/1989 | Kouno | B60W 30/18 | 474/28 |
| 4,875,892 A * | 10/1989 | Sueda | F16H 61/66259 | 474/17 |
| 4,881,925 A * | 11/1989 | Hattori | F16H 61/6625 | 474/18 |
| 4,942,786 A * | 7/1990 | Dittrich | F16H 61/66272 | 474/28 |
| 4,948,370 A * | 8/1990 | Yamada | F16H 61/66259 | 474/18 |
| 4,982,822 A * | 1/1991 | Petzold | B60K 41/142 | 192/3.58 |
| 5,006,093 A * | 4/1991 | Itoh | F16H 61/66259 | 474/28 |
| 5,230,663 A * | 7/1993 | Reniers | F16H 61/12 | 474/18 |
| 5,427,579 A * | 6/1995 | Kanehara | F16H 61/66259 | 474/28 |
| 5,486,142 A * | 1/1996 | Folsom | F16H 39/10 | 474/69 |
| 5,665,023 A * | 9/1997 | Aoki | F16H 61/66259 | 474/28 |
| 5,776,028 A * | 7/1998 | Matsuda | F16H 61/66272 | 474/28 |
| 5,944,626 A * | 8/1999 | Spiess | F16H 61/66259 | 474/18 |
| 5,961,408 A * | 10/1999 | Konig | F16H 61/12 | 474/18 |
| 6,099,424 A * | 8/2000 | Tsai | F16H 61/662 | 474/12 |
| 6,126,138 A * | 10/2000 | Tsai | F16H 61/66272 | 251/33 |
| 6,219,608 B1 * | 4/2001 | Abo | F16H 61/66259 | 474/28 |
| 6,243,638 B1 * | 6/2001 | Abo | F16H 61/66254 | 474/18 |
| 6,406,402 B1 * | 6/2002 | Eguchi | F16H 61/66254 | 474/28 |
| 6,461,261 B2 * | 10/2002 | Yamamoto | F16H 61/66272 | 474/8 |
| 6,464,603 B1 * | 10/2002 | Reuschel | F16H 61/66254 | 474/28 |
| 6,524,210 B1 * | 2/2003 | Vorndran | F16D 25/087 | 474/28 |
| 6,527,668 B2 * | 3/2003 | Vorndran | F16H 57/0413 | 474/28 |
| 6,569,044 B1 * | 5/2003 | Sen | F16H 61/66259 | 474/28 |
| 6,623,387 B1 * | 9/2003 | Luh | F16H 61/66272 | 474/28 |
| 6,682,451 B1 * | 1/2004 | Luh | F16H 61/12 | 474/18 |
| 6,692,388 B2 * | 2/2004 | Nirasawa | F16H 61/662 | 474/28 |
| 6,721,643 B1 * | 4/2004 | Hanggi | F16H 61/66263 | 474/28 |
| 6,764,421 B2 * | 7/2004 | Onogi | F16H 55/56 | 474/46 |
| 6,832,965 B2 * | 12/2004 | Inamura | F16H 61/66272 | 474/18 |
| 6,835,147 B2 * | 12/2004 | Iwata | F16H 61/12 | 474/18 |
| 6,997,832 B2 * | 2/2006 | Onogi | F16H 55/56 | 474/46 |
| 7,041,018 B2 * | 5/2006 | Ochiai | F16H 57/0434 | 474/18 |
| 7,074,144 B2 * | 7/2006 | Nobu | F16H 61/66272 | 474/18 |
| 7,169,070 B2 * | 1/2007 | Jozaki | F16H 61/12 | 474/18 |
| 7,387,589 B2 * | 6/2008 | Suzuki | F16H 61/66254 | 474/12 |
| 7,445,572 B2 * | 11/2008 | Kodama | F16H 61/0021 | 474/28 |
| 7,651,422 B2 * | 1/2010 | Yamamoto | F16H 61/66259 | 474/28 |
| 7,670,244 B2 * | 3/2010 | Shioiri | F16D 31/02 | 192/60 |
| 7,789,780 B2 * | 9/2010 | Iwasa | F16H 59/70 | 474/18 |
| 7,806,791 B2 * | 10/2010 | Izumi | F16H 61/66272 | 474/18 |
| 7,918,753 B2 * | 4/2011 | Murakami | F16H 61/66272 | 474/18 |
| 7,922,610 B2 * | 4/2011 | Nihei | F16H 61/0021 | 474/18 |
| 8,096,906 B2 * | 1/2012 | Inoue | F16H 61/66272 | 474/18 |
| 8,118,697 B2 * | 2/2012 | Brown | F16H 61/0025 | 474/18 |
| 2001/0046911 A1 * | 11/2001 | Taniguchi | F16H 61/66272 | 474/18 |
| 2001/0046912 A1 * | 11/2001 | Inamura | F16H 61/66272 | 474/28 |
| 2002/0173390 A1 * | 11/2002 | Sommer | F16H 61/66272 | 474/18 |
| 2002/0173391 A1 * | 11/2002 | Endo | B60K 6/44 | 474/18 |
| 2003/0022742 A1 * | 1/2003 | Fujimoto | F16H 61/0246 | 474/18 |
| 2003/0199345 A1 * | 10/2003 | Inamura | F16H 61/66272 | 474/18 |
| 2004/0059489 A1 * | 3/2004 | Hanggi | F16H 61/66263 | 701/51 |
| 2004/0063525 A1 * | 4/2004 | Ochiai | F16H 57/0434 | 474/28 |
| 2004/0127313 A1 * | 7/2004 | Shimanaka | F16H 61/66272 | 474/18 |
| 2004/0235595 A1 * | 11/2004 | Luh | F16H 61/66272 | 474/8 |
| 2005/0221931 A1 * | 10/2005 | Izumi | F16H 61/66259 | 474/69 |
| 2007/0111832 A1 * | 5/2007 | Reuschel | F16H 61/66254 | 474/12 |
| 2009/0005200 A1 * | 1/2009 | Brown | F16H 61/0025 | 474/24 |
| 2009/0264231 A1 * | 10/2009 | Ogata | F16H 61/12 | 474/11 |
| 2009/0298625 A1 * | 12/2009 | Kodama | F16H 61/66259 | 474/11 |
| 2010/0075801 A1 * | 3/2010 | Suzuki | F16H 37/022 | 477/44 |
| 2010/0248875 A1 * | 9/2010 | Jozaki | F16H 61/66259 | 474/29 |
| 2011/0039646 A1 * | 2/2011 | Willeke | F15B 13/0433 | 474/28 |
| 2011/0053718 A1 * | 3/2011 | Nonomura | F16H 61/66272 | 474/70 |
| 2012/0108373 A1 * | 5/2012 | Doihara | F16H 61/66272 | 474/28 |
| 2012/0108374 A1 * | 5/2012 | Doihara | F16H 61/66272 | 474/28 |
| 2012/0122628 A1 * | 5/2012 | Frank | B60K 6/36 | 477/3 |
| 2012/0135829 A1 * | 5/2012 | Doihara | F16H 61/66272 | 474/28 |
| 2012/0143448 A1 * | 6/2012 | Tohyama | F16H 61/12 | 701/51 |
| 2012/0252612 A1 * | 10/2012 | Kodama | F16H 61/66272 | 474/69 |
| 2012/0258825 A1 * | 10/2012 | Kodama | F16H 61/66272 | 474/69 |
| 2013/0260929 A1 * | 10/2013 | Aoyama | F16H 9/16 | 474/29 |

* cited by examiner

FIG.8

| TOTAL DELIVERY CAPACITY | PUMPS TO BE SELECTED | | | | |
|---|---|---|---|---|---|
| | Q1 | Q2 | Q3 | Q4 | Q5 |
| 18 | ○ | ○ | ○ | ○ | ○ |
| 17 |  | ○ | ○ | ○ | ○ |
| 16 | ○ |  | ○ | ○ | ○ |
| 15 | ○ | ○ |  | ○ | ○ |
|  |  |  | ○ | ○ | ○ |
| 14 |  | ○ |  | ○ | ○ |
| 13 | ○ | ○ | ○ |  | ○ |
|  | ○ |  |  | ○ | ○ |
| 12 |  |  |  | ○ | ○ |
| 11 | ○ | ○ | ○ | ○ |  |
|  | ○ |  | ○ |  | ○ |
| 10 |  |  |  |  |  |
|  |  |  |  |  |  |
|  |  | ○ | ○ | ○ |  |
| 9 | ○ |  | ○ | ○ |  |
|  |  | ○ |  |  | ○ |

HYDRAULIC PRESSURE SUPPLY APPARATUS FOR AUTOMATIC TRANSMISSION

TECHNICAL FIELD

Embodiments of this invention relate to a hydraulic pressure supply apparatus for an automatic transmission.

RELATED ART

A known technology concerning a hydraulic pressure supply apparatus for an automatic transmission is described, for example, in Japanese Laid-Open Patent Application No. 2005-337502. The technology described in the reference relates to a hydraulic pressure supply apparatus for supplying hydraulic oil to a vehicle automatic transmission and, to be more concrete, is configured to use two hydraulic pumps to switch pressure supplied to the automatic transmission between two types (high and low).

More specifically, the technical concept described in the reference makes it possible to realize hydraulic oil supply matched to transmission demand by a configuration that comprises a low-pressure circuit using a first pump to supply a low hydraulic pressure P1 at a volumetric flow rate V1 and a high-pressure circuit using a second pump to supply a high hydraulic pressure P2 at a volumetric flow rate V2, supplies two types of pressure (high and low) from these circuits, and as necessary increases the pressure P1 of the low-pressure circuit to the pressure P2 of the high-pressure circuit to supply flow rate V1+V2.

SUMMARY

Of note here is that some automatic transmissions are equipped with three or more hydraulic actuators different from one another in required hydraulic pressure, but even in such a case, the technology described by the reference uses the two hydraulic pumps to generate the maximum required hydraulic pressures P1, P2 at the respective flow rates V1, V2 and supplies them to the hydraulic actuators either without modification or after suitable pressure reduction and flow rate reduction.

As this results in a disadvantage of a substantial portion of the hydraulic energy generated by the hydraulic pumps being wasted as heat, there is room for improvement from the viewpoint of energy efficiency.

Therefore, embodiments are directed to overcoming the foregoing problem by providing a hydraulic pressure supply apparatus for an automatic transmission which improves energy efficiency by minimizing wasted hydraulic energy to the utmost possible even in the case where three or more hydraulic actuators different from one another in required pressure are installed.

In order to achieve the object, embodiments provide a hydraulic pressure supply apparatus for an automatic transmission having hydraulic pressure supply destinations comprising at least three hydraulic actuators different from one another in required hydraulic pressure and a lubrication system, comprising: at least three hydraulic pumps connected to a prime mover and installed in oil passages connecting the hydraulic pressure supply destinations and a reservoir, to pump hydraulic oil from the reservoir and deliver it to the oil passages when driven by the prime mover; at least three regulator valves installed in the oil passages to be capable of regulating the hydraulic pressures delivered from the hydraulic pumps to values corresponding to the respective required hydraulic pressures and delivering them to the hydraulic pressure supply destinations; selector valves installed in the oil passages at locations between the hydraulic pumps and regulator valves; and a controller that controls operation of the selector valves so as to connect the hydraulic pumps to the regulator valves in accordance with the required flow rates of the hydraulic pressure supply destinations.

BRIEF DESCRIPTION OF THE DRAWINGS

The above and other objects and advantages of embodiments of the invention will be more apparent from the following description and drawings in which:

FIG. 8 is an explanatory diagram showing the operation of a hydraulic pressure supply mechanism of a hydraulic pressure supply apparatus for an automatic transmission according to a fourth embodiment;

DESCRIPTION OF EMBODIMENTS

Figure 1:
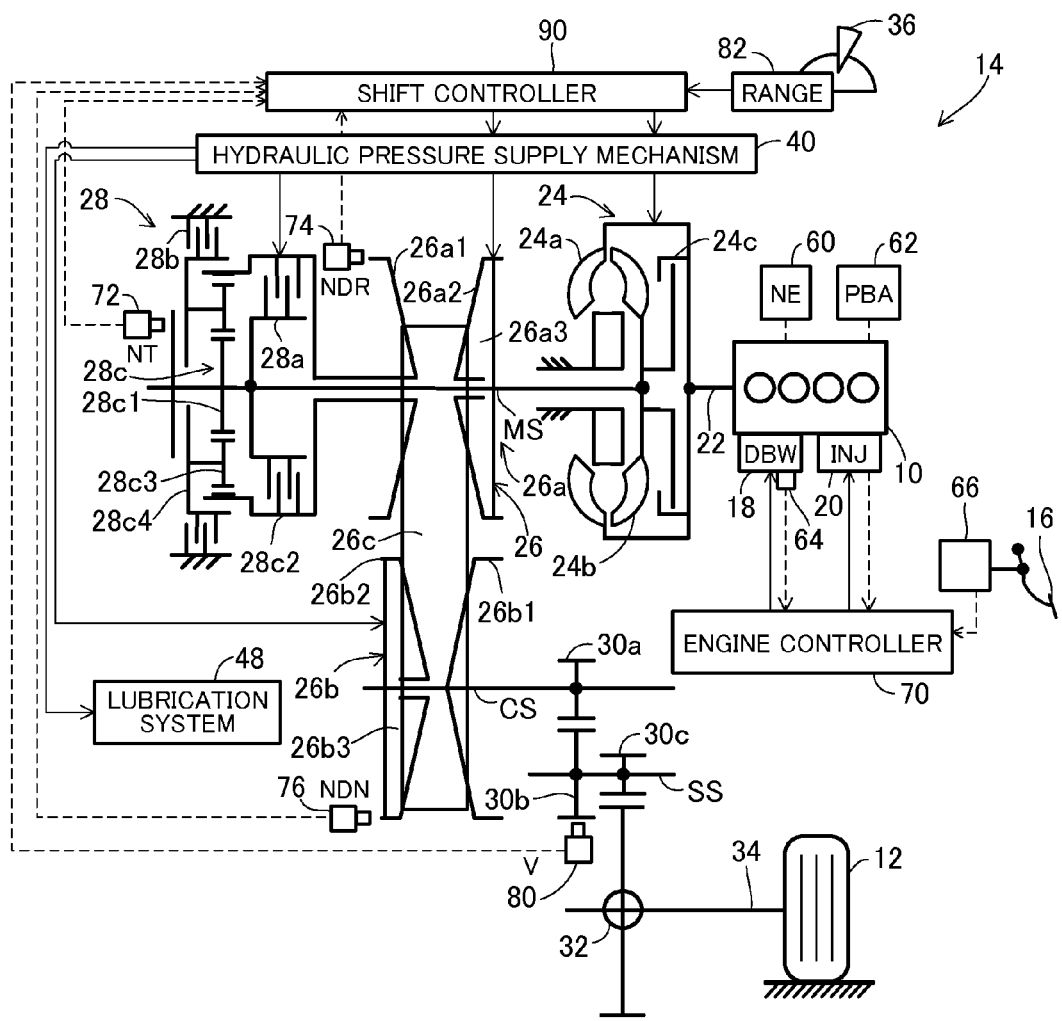
FIG. 1 is a schematic diagram showing an overall view of a hydraulic pressure supply apparatus for an automatic transmission according to a first embodiment.
Figure 2:
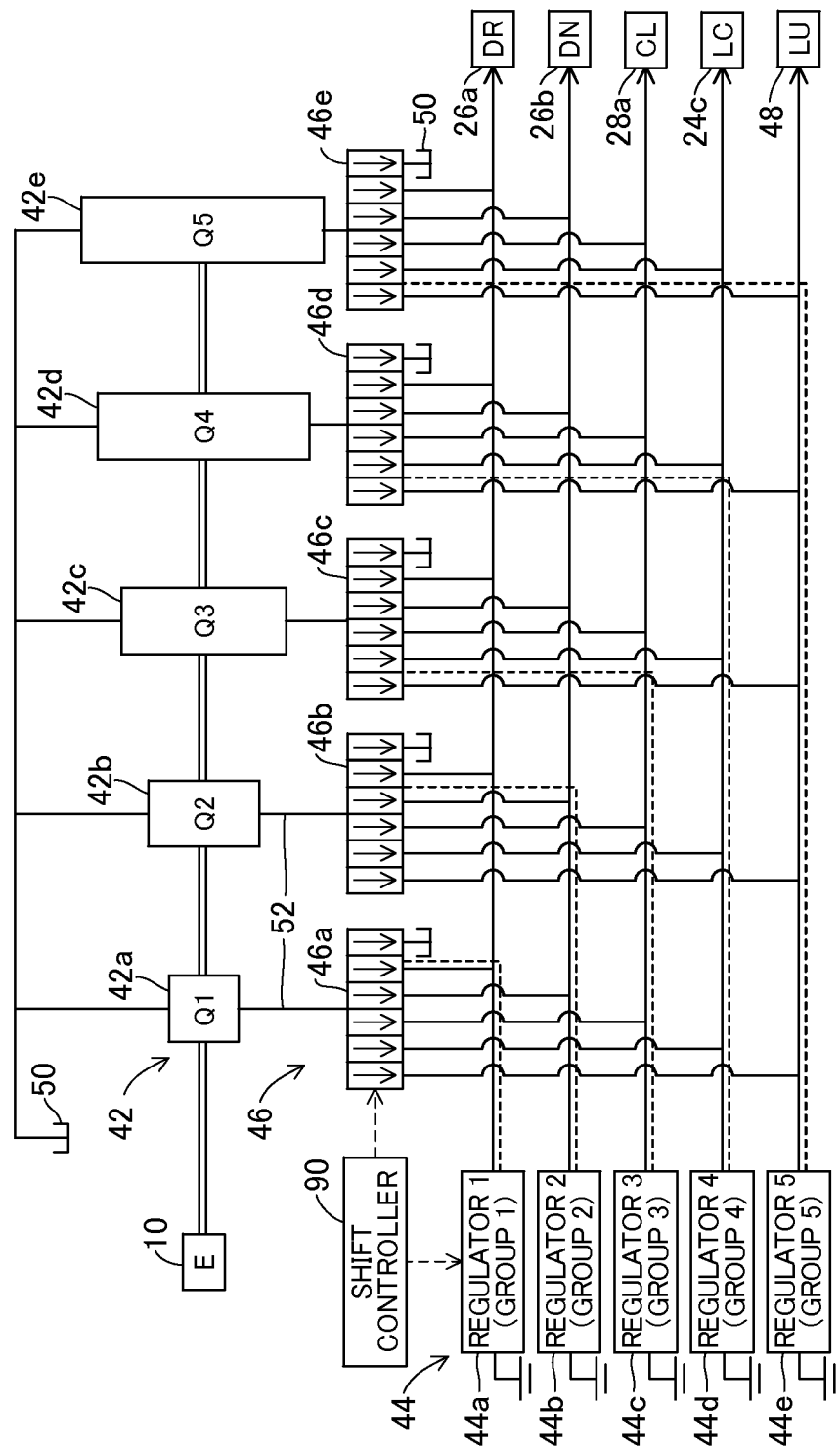
FIG. 2 is a schematic diagram showing an overall view of a hydraulic pressure supply mechanism shown in FIG. 1.
Figure 3:
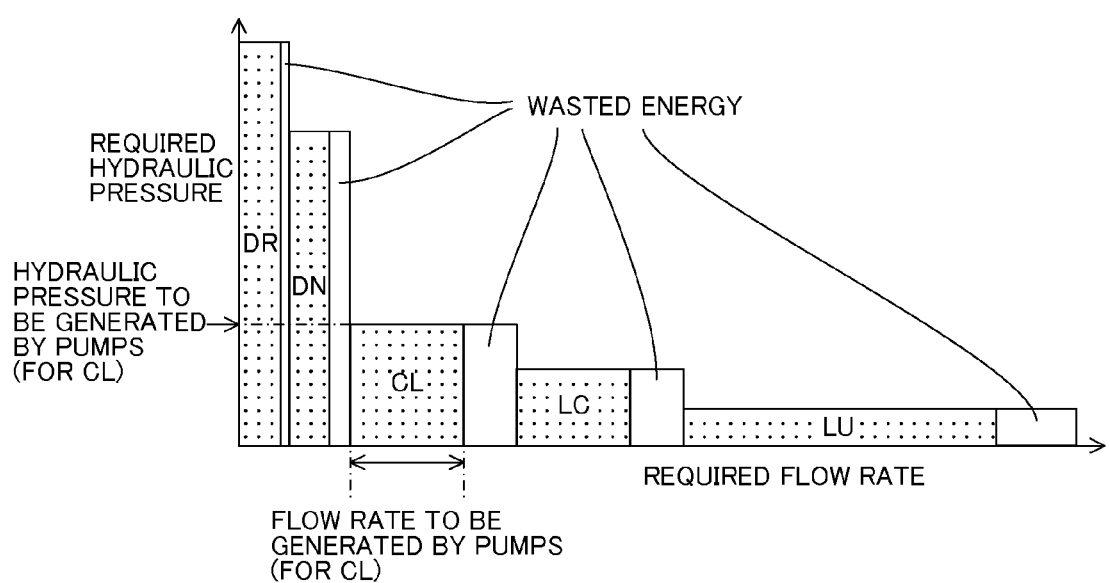
FIG. 3 is an explanatory diagram showing energy loss characteristics of the hydraulic pressure supply mechanism shown in FIG. 2.

FIG. 1 is a schematic diagram showing an overall view of a hydraulic pressure supply apparatus for an automatic transmission according to a first embodiment; FIG. 2 is a schematic diagram showing an overall view of a hydraulic pressure supply mechanism shown in FIG. 1; and FIG. 3 is an explanatory diagram showing energy loss characteristics of the hydraulic pressure supply mechanism shown in FIG. 2.

Symbol 10 in FIG. 1 designates an engine (internal combustion engine (prime mover)) having a plurality of cylinders. The engine 10 is mounted in a vehicle 14 provided with drive wheels 12 (the vehicle 14 is indicated partially by the engine 10, drive wheels 12, etc.).

A throttle valve (not shown) installed in an air-intake system of the engine 10 is mechanically disconnected from an accelerator pedal 16 installed on the floor at a vehicle operator's seat and is connected to and opened/closed by a DBW (Drive By Wire) mechanism 18 comprising an electric motor or other actuator.

Intake air regulated by the throttle valve flows through an intake manifold to be mixed with fuel injected from injectors 20 located at intake ports of respective cylinders to form an air-fuel mixture that flows into the cylinder combustion chambers when intake valves open. In each combustion chamber, the fuel mixture is ignited by a sparkplug and burns, thereby driving a piston and rotating an output shaft 22 connected to a crankshaft, whereafter it is discharged out of the engine 10 as exhaust.

The rotation of the output shaft 22 of the engine 10 is inputted through a torque converter 24 to a Continuously Variable Transmission (automatic transmission, hereinafter called "CVT") 26. Specifically, the output shaft 22 of the engine 10 is connected to a pump impeller 24a of the torque converter 24, while a turbine-runner 24b installed opposite thereto to receive a fluid (hydraulic oil, CVTF) is connected to a main shaft (input shaft) MS. The torque converter 24 is equipped with a lock-up clutch 24c having a hydraulic mechanism comprising a piston slidable inside a cylinder.

The CVT 26 comprises a drive (DR) pulley 26a fitted on the main shaft MS, more exactly on an outer shaft coaxially spline-fitted on the main shaft MS, a driven (DN) pulley 26b fitted on a countershaft (output shaft) CS which is parallel to the main shaft MS and connected to the drive wheels 12, more exactly on an outer shaft coaxially spline-fitted on the counter shaft CS, and an endless transmission element wound around the drive and driven pulleys, e.g., a metal belt 26c.

The drive pulley 26a comprises a fixed pulley half 26a1 fitted on the outer shaft of the main shaft MS to be incapable of relative rotation and of axial direction movement, a movable pulley half 26a2 incapable of rotation relative to the outer shaft of the main shaft MS and capable of relative movement with respect to the fixed pulley half 26a1 in the axial direction of the shaft, and a hydraulic mechanism 26a3 comprising a piston, cylinder and spring and installed on a side of the movable pulley half 26a2 to press the movable pulley half 26a2 toward the fixed pulley half 26a1 when supplied with hydraulic pressure (hydraulic oil (CVTF) pressure).

The driven pulley 26b comprises a fixed pulley half 26b1 fitted on the outer shaft of the countershaft CS to be incapable of relative rotation and of axial direction movement, a movable pulley half 26b2 incapable of rotation relative to the countershaft CS and capable of relative movement with respect to the fixed pulley half 26b1 in the axial direction of the shaft, and a hydraulic mechanism 26b3 comprising a piston, cylinder and spring and installed on a side of the movable pulley half 26b2 to press the movable pulley half 26b2 toward the fixed pulley half 26b1 when supplied with hydraulic pressure (oil).

The CVT 26 is connected to the engine 10 through a forward-reverse switching mechanism 28. The forward-reverse switching mechanism 28 comprises a forward clutch 28a that enables the vehicle 14 to run forward, a reverse brake-clutch 28b that enables reverse running, and a planetary gear mechanism 28c located between the two clutches. The CVT 26 is connected to the engine 10 through the forward clutch 28a.

The forward clutch 28a and reverse brake-clutch 28b are each equipped with a pressure mechanism comprising a piston slidable inside a cylinder.

In the planetary gear mechanism 28c, a sun gear 28c1 is fixed on the main shaft MS and a ring gear 28c2 is fixed on the fixed pulley half 26a1 of the drive pulley 26a through the forward clutch 28a. A pinion 28c3 is installed between the sun gear 28c1 and the ring gear 28c2. The pinion 28c3 is connected to the sun gear 28c1 by a carrier 28c4. When the reverse brake-clutch 28b is operated, the carrier 28c4 is fixed (locked) as a result.

The rotation of the countershaft CS is transmitted from a secondary shaft (intermediate shaft) SS to the drive wheels 12 through gears. Specifically, the rotation of the countershaft CS is transmitted through gears 30a, 30b to the secondary shaft SS, and the rotation of the secondary shaft SS is transmitted through a gear 30c and to the left and right drive wheels (only the right wheel shown) 12 from a differential 32 through a driveshaft 34.

Thus, the CVT 26 is on the one hand connected to the engine 10 through the torque converter 24 and is on the other hand connected to the drive wheels 12 through the forward-reverse switching mechanism 28. The drive/driven pulleys 26a, 26b of the CVT 26, the lock-up clutch 24c of the torque converter 24, and the forward clutch 28a (and reverse brake-clutch 28b) of the forward-reverse switching mechanism 28 are, as indicated above, equipped with the hydraulic mechanisms 26a3, 26b3 and the like, and, therefore, the drive/driven pulleys 26a, 26b of the CVT 26, the lock-up clutch 24c of the torque converter 24, and the forward clutch 28a (and reverse brake-clutch 28b) of the forward-reverse switching mechanism 28 are hereinafter called hydraulic actuators.

The operator switches between the forward clutch 28a and the reverse brake-clutch 28b in the forward-reverse switching mechanism 28 by operating a range selector 36 provided near the vehicle operator's seat so as to select a range from among P, R, N and D, for example. The range selection by the operator's operation of the range selector 36 is transmitted to a manual valve of a hydraulic pressure supply mechanism 40.

As shown in FIG. 2, the hydraulic pressure supply mechanism 40 comprises at least three, in this embodiment five, hydraulic pumps 42, at least three, in this embodiment five, regulator valves 44, and five selector valves 46 installed between the hydraulic pumps 42 and the regulator valves 44. The five regulator valves 44 are illustrated in the figure as "regulator" with suffix numerals 1 to 5.

The five hydraulic pumps 42 are a first hydraulic pump (Q1) 42a, a second hydraulic pump (Q2) 42b, a third hydraulic pump (Q3) 42c, a fourth hydraulic pump (Q4) 42d, and a fifth hydraulic pump (Q5) 42e.

The five hydraulic pumps 42 are connected to oil passages 52 that connect five hydraulic pressure supply destinations and a reservoir 50, and are configured to pump hydraulic oil from the reservoir 50 and deliver it to the oil passages 52 when driven by the engine 10. The five hydraulic pressure supply destinations comprises the hydraulic actuators of the CVT 26, i.e., the hydraulic actuators constituted by the drive/driven pulleys 26a, 26b, the forward clutch 28a (and reverse brake-clutch 28b) of the forward-reverse switching mechanism 28, and the lock-up clutch 24c of the torque converter 24, and a lubrication system 48 of the CVT 26. When the CVT 26 is accommodated in a transmission case mounted in the vehicle 14, an oil pan formed under the transmission case in the gravity direction serves as the reservoir 50.

In FIGS. 2 and 3, the hydraulic pressures required by the drive/driven pulleys 26a, 26b are designated as DR, DN, that required by the forward clutch 28a (and reverse brake-clutch 28b) as CL, that required by the lock-up clutch 24c as LC, and that required by the lubrication system 48 as LU. The lubrication system 48 refers collectively to parts or components of the drive/driven pulleys 26a, 26b, the gears 30a, 30b, and so on that require lubrication.

FIG. 3 shows the hydraulic pressures [MPa] and flow rates [1/min] generated for supply to the four hydraulic actuators when the CVT 26 is in a given operating state (e.g., steady operating state), and also shows the drained waste (drain oil) energies (functions of hydraulic pressure and flow rate) at this time.

As illustrated, in steady operating state, the highest required pressures are DR, DN of the drive/driven pulleys 26a, 26b, followed in descending order by CL of the forward clutch 28a (and reverse brake-clutch 28b), LC of the lock-up clutch 24c, and LU of the lubrication system 48.

In contrast, the lowest required flow rates are those of the drive/driven pulleys 26a, 26b, while those of the forward clutch 28a (and reverse brake-clutch 28b) and the lock-up clutch 24c are substantially equal and higher than those of the drive/driven pulleys 26a, 26b, and that of the lubrication system 48 is still higher. However, as the size of these flow rates differs depending on the design and operating state of the CVT 26, FIG. 3 merely represents one example.

The five hydraulic pumps 42 comprise all inscribed gear pumps having inner rotors and outer rotors, and are individually and coaxially connected to the output shaft 22 of the engine (E) 10 via belt-pulley or other suitable speed variation means.

The rated discharge pressures [MPa] of the five hydraulic pumps 42 are all set identically at the value DR of the highest-pressure drive pulley 26a, and the discharge rates [1/min] are set to increase gradually from the first hydraulic pump (Q1) 42a to the fifth hydraulic pump (Q5) 42e (to be different from each other). Depending on the ratio, the hydraulic pressures of the drive/driven pulleys 26a, 26b may reverse to make DN the higher pressure. So the illustrated case is just one example.

Specifically, the discharge rates of the hydraulic pumps 42 are set to establish the relationship: first hydraulic pump (Q1) 42a<second hydraulic pump (Q2) 42b<third hydraulic pump (Q3) 42c<fourth hydraulic pump (Q4) 42d<fifth hydraulic pump (Q5) 42e.

The five hydraulic pressure supply destinations constituted by the four hydraulic actuators, namely, the drive/driven pulleys 26a, 26b, the forward clutch 28a (and reverse brake-clutch 28b) and the lock-up clutch 24c, and the lubrication system 48 are grouped into Group 1 to Group 5, and the five regulator valves 44, namely, first to fifth regulator valves 44a, 44b, 44c, 44d, 44e, are assigned to respective groups.

All of the regulator valves 44 comprise electromagnetic solenoid valves having spools displaceable by plungers of the electromagnetic solenoids and are adjusted to displace the plungers in response to amount of current passage so as to realize values corresponding to the hydraulic pressures to be supplied to the connected hydraulic pressure supply destinations.

Further, the five selector valves 46 comprise first selector valve 46a to fifth selector valve 46e and, like the regulator valves 44, are all made of electromagnetic solenoid valves having spools displaceable by plungers of the electromagnetic solenoids.

The selector valves 46 are placed or deployed between the five hydraulic pumps 42 and five regulator valves 44 and configured to displace the plungers in response to amount of supplied current so as to connect the outputs of the hydraulic pumps 42 sent through the oil passages 52 to the five hydraulic pressure supply destinations whose pressure are regulated by the regulator valves 44. In this embodiment, a number of the hydraulic pumps 42 is the same as the number of regulator valves 44, but the number of hydraulic pumps 42 can be greater.

The first selector valve 46a to fifth selector valve 46e have six output ports each, five of which are connected to the first to fifth regulator valves (Group 1 to Group 5) 44a to 44e and one of which is connected to the reservoir 50 as an oil drain port.

The hydraulic pressure supply mechanism 40 supplies hydraulic pressure to the drive/driven pulleys 26a, 26b, specifically their hydraulic mechanisms 26a3, 26b3, of the CVT 26 to move the movable pulley halves 26a2, 26b2 in the axial direction, thereby varying the pulley widths across the drive/driven pulleys 26a, 26b so as to vary the winding radii of the belt 26c and thus transmit the driving force of the engine 10 to the drive wheels 12 at a continuously variable transmission ratio.

Although omitted in the drawings, the hydraulic pressure supply mechanism 40 is equipped with various control valves and electromagnetic valves installed in oil passages connecting the regulator valves 44 and hydraulic actuators, whereby hydraulic pressure is supplied to the lock-up clutch 24c (more specifically, the hydraulic pressure mechanism thereof) of the torque converter 24 in accordance with the operating condition and engage/disengage the lock-up clutch 24c, and hydraulic pressure is supplied through a manual valve responsive to the position of the range selector 36 selected by the operator and applied to the forward clutch 28a or reverse brake-clutch 28b (more specifically, the hydraulic mechanisms thereof) of the forward-reverse switching mechanism 28, thereby enabling the vehicle 14 to drive forward or backward.

Returning to the explanation of FIG. 1, a crank angle sensor 60 provided at a suitable location, such as near a cam shaft (not shown) of the engine 10, outputs a signal indicating engine speed NE once every predetermined piston crank angle position. A manifold absolute pressure sensor 62 provided in the air-intake system at a suitable position downstream of the throttle valve outputs a signal proportional to the manifold absolute pressure (engine load) PBA inside the air-intake pipe.

A throttle opening sensor 64 is provided at the actuator of the DBW mechanism 18 to output a signal proportional to throttle valve opening TH through the amount of actuator rotation, and an accelerator position sensor 66 is provided near the accelerator pedal 16 to output a signal proportional to accelerator position AP corresponding to the amount of depression of the accelerator pedal 16 (amount of accelerator pedal operation) by the operator.

The outputs of the crank angle sensor 60 and other sensors are sent to an engine controller 70. The engine controller 70, which is equipped with a microcomputer comprising a CPU, ROM, RAM, I/O and the like, controls the operation of the DBW mechanism 18 in accordance with the outputs of these sensors and controls fuel injection through the injectors 20 and ignition timing through an ignition device.

An NT sensor (rotational speed sensor) 72 provided on the main shaft MS outputs a pulse signal indicating the rotational speed NT of the main shaft MS (torque converter turbine rotational speed corresponding to transmission input shaft rotational speed), and an NDR sensor (rotational speed sensor) 74 provided at a suitable location near the drive pulley 26a of the CVT 26 outputs a pulse signal in accordance with the rotational speed NDR of the drive pulley 26a.

Further, an NDN sensor (rotational speed sensor) 76 provided at a suitable location near the driven pulley 26b outputs a pulse signal indicating the rotational speed NDN of the driven pulley 26b (transmission output shaft rotational speed), and a vehicle speed sensor (rotational speed sensor) 80 provided near the gear 30b of the secondary shaft SS outputs a pulse signal indicating the rotational speed and rotational direction of the secondary shaft SS (specifically, a pulse signal indicating the vehicle speed V).

Moreover, a range selector switch 82 provided near the range selector 36 outputs a signal indicative of the P, R, N, D or other range selected by the operator.

The outputs of the NT sensor 72 and other sensors mentioned above are sent to a shift controller 90. The shift controller 90 is also equipped with a microcomputer comprising a CPU, ROM, RAM, I/O and the like and is configured to communicate with the engine controller 70.

Based on the detected values, the shift controller 90 functions as the aforesaid controller to control the operation of the selector valves 46 so as to connect the hydraulic pumps 42 to the regulator valves 44 in accordance with the flow rates required by the five hydraulic pressure supply destinations, whereby, as shown in FIGS. 2 and 3, the regulator valves 44 effect control for supplying the required hydraulic pressures and flow rates to the five hydraulic pressure supply destinations comprising the hydraulic actuators and the lubrication system 48.

Hydraulic pressure supply in the prior art, including the aforesaid reference, will be explained here with reference to FIG. 13, which is a schematic diagram for explaining the hydraulic pressure and flow rate required by the CVT 26 while the vehicle 14 is being driven.

Where the essentially required hydraulic pressure P and flow rate Q are defined as PDR and QDR for the drive pulley 26a, PDN and QDN for the driven pulley 26b, PCL and QCL for the forward clutch 28a, PLC and QLC for the lock-up clutch 24c of the torque converter 24, and PLU and QLU for the lubrication system 48, the total work per unit time to be performed by the hydraulic pumps is essentially only PDR×QDR+PDN×QDN+PCL×QCL+PLC×QLC+PLU×QLU.

However, when the number of hydraulic pumps is only one or two, and even if they are variable delivery pumps, then insofar as pressure-reduced hydraulic oil cannot be increased in flow rate and used, the energy that must once be generated becomes PDR (highest required pressure)×(QDR+QDN+QCL+QLC+QLU).

In this case, therefore, the energy shown below comes to be converted to heat by the regulator valves and the like and wastefully discharged without being used for work.

Discharged energy=$(PDR-PDN) \times QDN + (PDR-PCL) \times QCL + (PDR-PLC) \times QLC + (PDR-PLU) \times QLU$ This embodiment was achieved based on the foregoing knowledge and, as shown in FIGS. 2 and 3, adopts a configuration that comprises the at least three, in this embodiment five, hydraulic pumps 42, the at least three, in this embodiment five, regulator valves 44 capable of regulating hydraulic pressures delivered from the hydraulic pumps to values corresponding to the respective required pressures to be supplied to the hydraulic pressure supply destinations, and the selector valves 46 installed between the hydraulic pumps 42 and the regulator valves 44, wherein the operation of the selector valves 46 is controlled to connect the hydraulic pumps 42 to the regulator valves 44 in accordance with the flow rates required by five hydraulic pressure supply destinations comprising the hydraulic actuators and the lubrication system 48.

The connection of the hydraulic pumps 42 and regulator valves 44 by the selector valves 46 is performed, for example, as indicated by broken lines in FIG. 2.

Specifically, the connection of the hydraulic pumps 42 and regulator valves 44 is performed as follows. Namely, the hydraulic pump 42 to be assigned to the hydraulic pressure supply destination requiring the highest flow rate is determined first (STEP 1). Next, the hydraulic pump 42 to be assigned to the hydraulic pressure supply destination requiring the second highest flow rate is selected from among the hydraulic pumps 42 not used in STEP 1 (STEP 2).

Next, the hydraulic pump 42 to be assigned to the hydraulic pressure supply destination requiring the third highest flow rate is selected from among the hydraulic pumps 42 not used in STEPs 1, 2 (STEP3).

Next, the hydraulic pump 42 to be assigned to the hydraulic pressure supply destination requiring the fourth highest flow rate is selected from between the hydraulic pumps 42 not used in STEPs 1, 2, 3 (STEP 4).

Finally, the hydraulic pump 42 not used in STEPs 1, 2, 3, 4 is selected as the hydraulic pump 42 to be assigned to the hydraulic pressure supply destination requiring the fifth highest flow rate (STEP 5).

Instead of the foregoing, the hydraulic pumps 42 can be preferentially assigned starting from the supply destination requiring the highest hydraulic pressure. In either case, it is preferable to ascertain the hydraulic pressure and flow rate required by each supply destination and select a combination that minimizes the product thereof.

Owing to the aforesaid configuration, this embodiment enables the individual required hydraulic pressures to be independently regulated by the respective regulator valves 44, so that hydraulic energy that comes to be wasted can be minimized to the utmost to realize enhanced energy efficiency even in the case where four hydraulic actuators different in required hydraulic pressure are installed.

Namely, unlike the prior art, including the technology described in the aforesaid reference, this embodiment does not use a hydraulic pump to once generate the greatest hydraulic pressure required and a flow rate equal to or greater than the required total flow rate and then perform pressure-reduction to obtain the desired hydraulic pressures/flow rates, in other words, it does not lose energy by using a hydraulic pump to first generate excessive hydraulic pressure and flow rate and then waste their energy as heat, so that it enables energy efficiency enhancement by optimally minimizing hydraulic energy wastage.

More specifically, the flow rate required by each hydraulic actuator can be controlled by the total delivery capacity of the five hydraulic pumps 42 interconnected in accordance with the states of the selector valves 46, so that the five hydraulic pumps 42 can be controlled to generate only the hydraulic pressures and flow rates required by the hydraulic actuators of the CVT 26 instant by instant, thus enabling a quantum improvement in energy efficiency.

Figure 13:
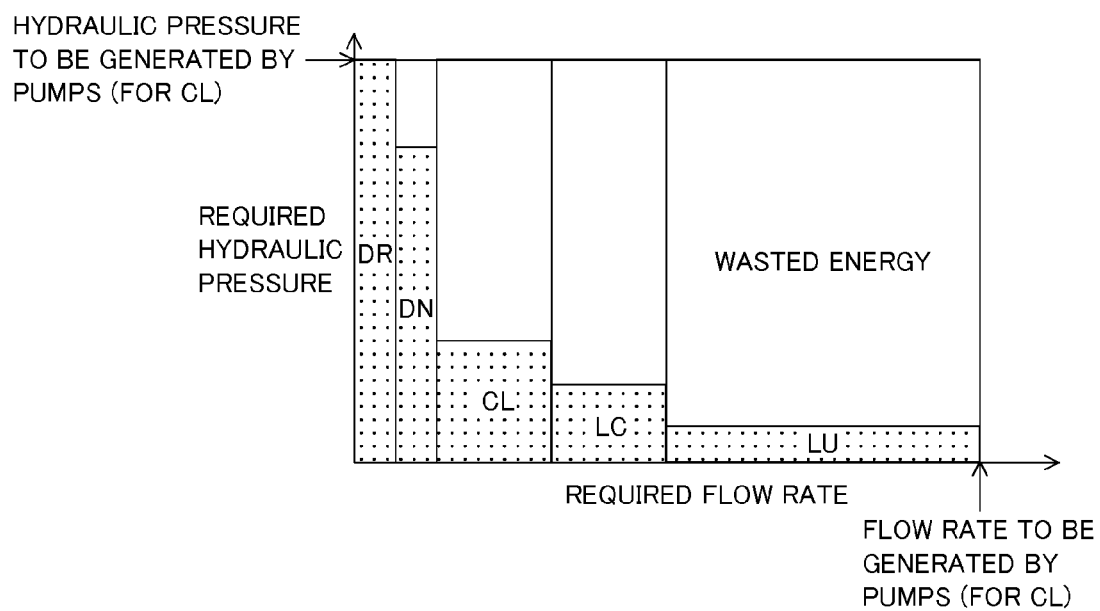
FIG. 13 is a view, similar to FIG. 3, but showing energy loss characteristics of the hydraulic pressure supply mechanism of the prior art.

In other words, as shown in FIG. 3, wasted energy can be considerably reduced compared to that in the prior art shown in FIG. 13, so that the amount of wastefully dissipated energy (heat) can be markedly reduced.

Further, since heat generated per unit time during operation of the CVT 26 under predetermined conditions can be reduced and loss of anti-wear property between metal components of the CVT 26 owing to hydraulic oil degradation by temperature increase can be prevented, thus enabling further enhancement of CVT 26 durability/reliability and avoidance of increases in weight and cost due to installation of an oil cooler and other equipment for augmenting hydraulic oil cooling capability.

Moreover, the five hydraulic pumps 42 are all fixed-delivery pumps and all of the regulator valves 44 communicate with the hydraulic pumps 42 through the selector valves 46 to establish mutually different capacities, which is a configuration that enables the five hydraulic pumps 42 to be communicated with appropriate regulator valves 44 in suitable numbers that need to be operated when the required flow rates for the respective hydraulic pressures have been determined, thereby further improving energy efficiency. Concomitantly, energy loss attributable to recirculation to the inlets of the hydraulic pumps 42 and pressure reduction/dumping at the regulator valves 44 can be held to the minimum.

Moreover, since the configuration defines the number of hydraulic pumps 42 as five and thus to be the same as (and not less than) the number of regulator valves 44 (also five), the hydraulic pumps 42 generate only the minimum required flow rates with respect to the hydraulic pressure supply destinations, i.e., they are operated to do only minimal work.

Further, the automatic transmission is connected to the engine 10 through the torque converter 24 on the one hand and comprises the CVT 26 connected to the drive wheels 12 through the forward-reverse switching mechanism 28, while the hydraulic pressure supply destinations are constituted by at least the drive/driven pulleys 26a, 26b of the CVT 26, the forward clutch 28a of the forward-reverse switching mechanism 28, the lock-up clutch 24c of the torque converter 24, and the lubrication system 48, and thanks to this configuration, even in the case where the automatic transmission includes the torque converter 24 and forward-reverse switching mechanism 28 and needs to ensure hydraulic flow rates for at least five systems including at least the lock-up clutch 24c, forward clutch 28a, drive/driven pulleys 26a, 26b, and lubrication system 48, it is possible by regulating the hydraulic pressures and flow rates of the individual systems to reduce unnecessary work of the hydraulic pumps 42 and thereby further upgrade energy efficiency.

Figure 4:
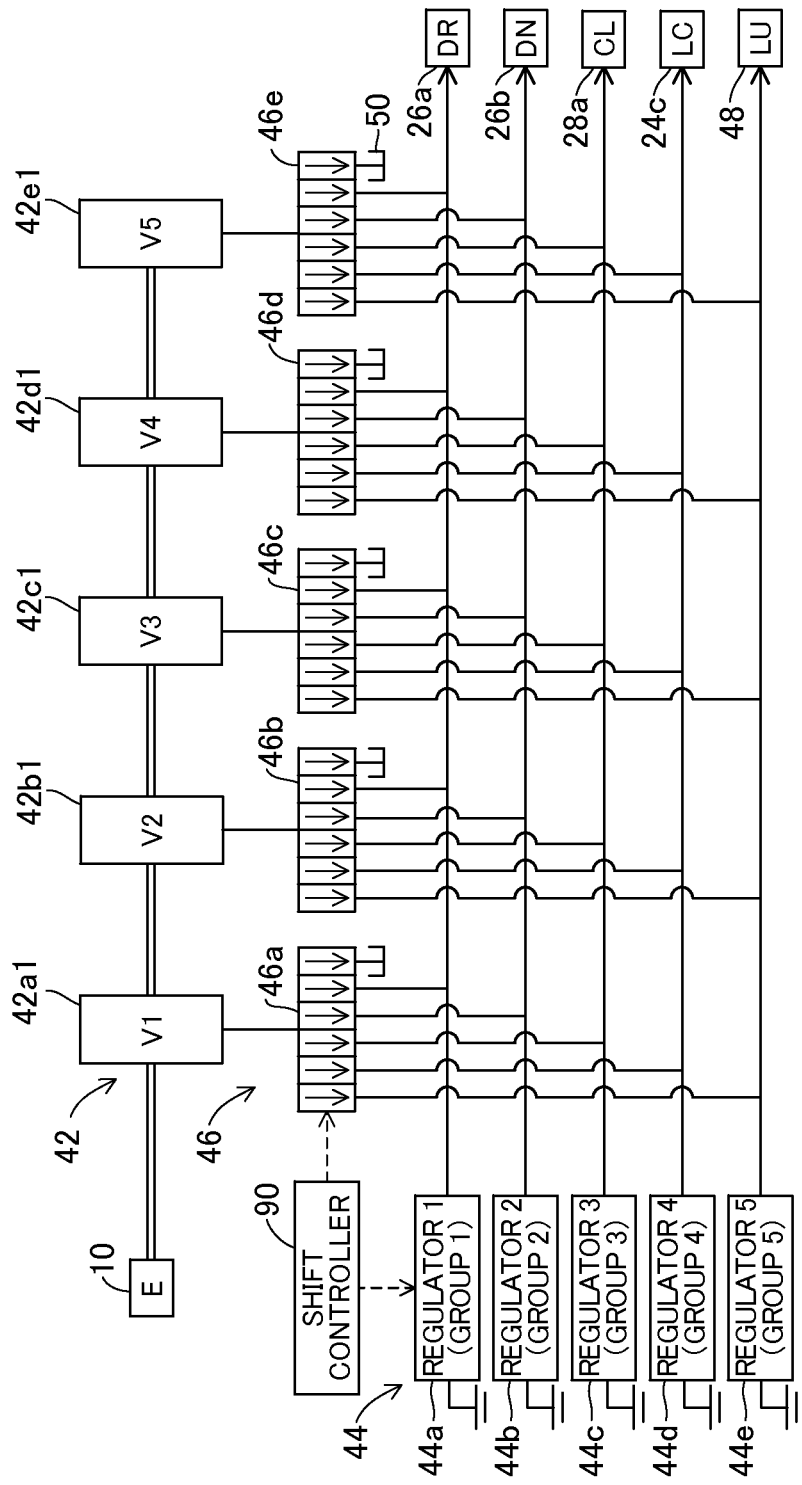
FIG. 4 is a schematic diagram showing the essentials of a hydraulic pressure supply mechanism of a hydraulic pressure supply apparatus for an automatic transmission according to a second embodiment.
Figure 5:
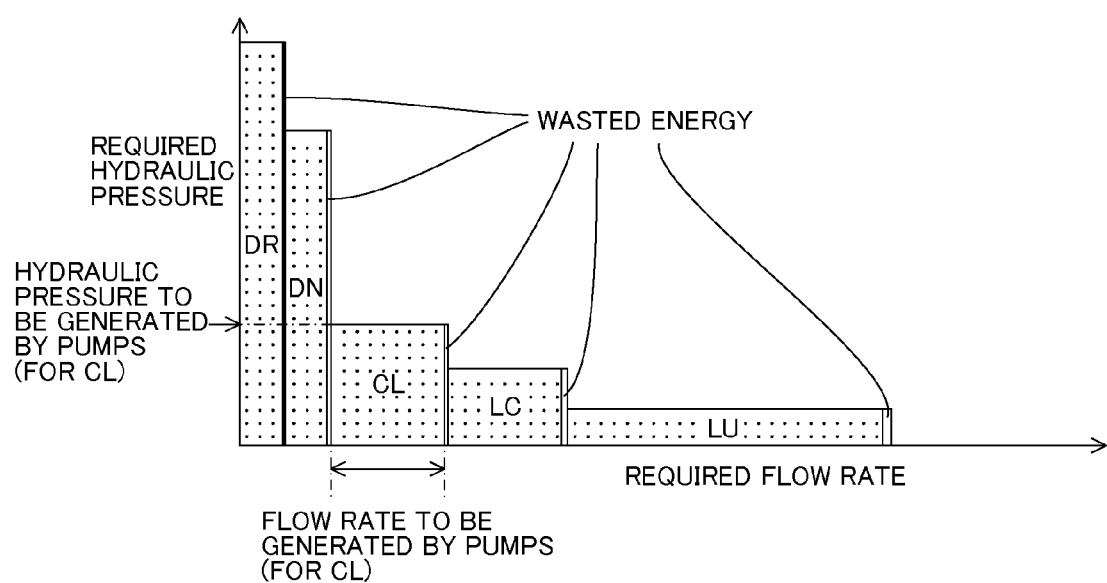
FIG. 5 is an explanatory view showing energy loss characteristics of the hydraulic pressure supply mechanism shown in FIG. 4.

FIG. 4 is a schematic diagram showing the essentials of a hydraulic pressure supply mechanism of a hydraulic pressure supply apparatus for an automatic transmission according to a second embodiment, and FIG. 5 is an explanatory view showing energy loss characteristics of the hydraulic pressure supply mechanism.

Focusing explanation on the points of difference from the first embodiment, the second embodiment is configured so that all of the five hydraulic pumps 42 are variable delivery pumps, designated 42a1, 42b1, 42c1, 42d1 and 42e1.

Specifically, one variable-delivery-type hydraulic pump 42 is connected to each of the regulator valves 44a, 44b, 44c, 44d, 44e for each required hydraulic pressure needed, and the connected hydraulic pump 42 supplies hydraulic oil at the required flow rate. In terms of principle, this configuration can achieve zero wasted consumption of energy generated by the hydraulic pumps 42.

The second embodiment can also be configured to connect multiple hydraulic pumps 42 to a predetermined regulator valve 44 through the selector valves 46. In this case, for example, multiple variable delivery pumps 42 of the same capacity can be installed with respect to a single hydraulic pressure supply destination, so that the total number of pumps may sometimes be greater than when a single variable delivery pump is installed with respect to each hydraulic pressure supply destination, but total cost can be reduced because identical discharge rates of the hydraulic pumps 42 can be achieved without fail.

Owing to the aforesaid configuration of the hydraulic pressure supply apparatus for an automatic transmission according to the second embodiment, the five hydraulic pumps 42a1 to 42e1 can be operated more appropriately so as to generate the minimum required flow rates with respect to each hydraulic pressure supply destination, thereby enabling a still further improvement of energy efficiency. Other aspects of the configuration and the effects are no different from those of the first embodiment.

Figure 6:
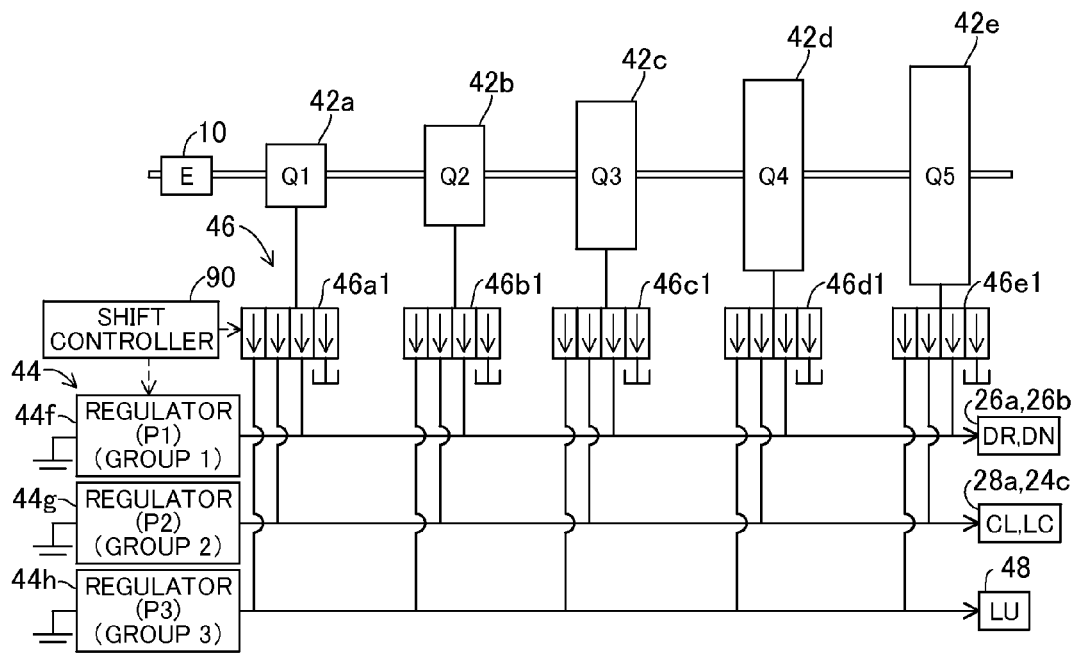
FIG. 6 is a schematic diagram showing the essentials of a hydraulic pressure supply mechanism of a hydraulic pressure supply apparatus for an automatic transmission according to a third embodiment.
Figure 7:
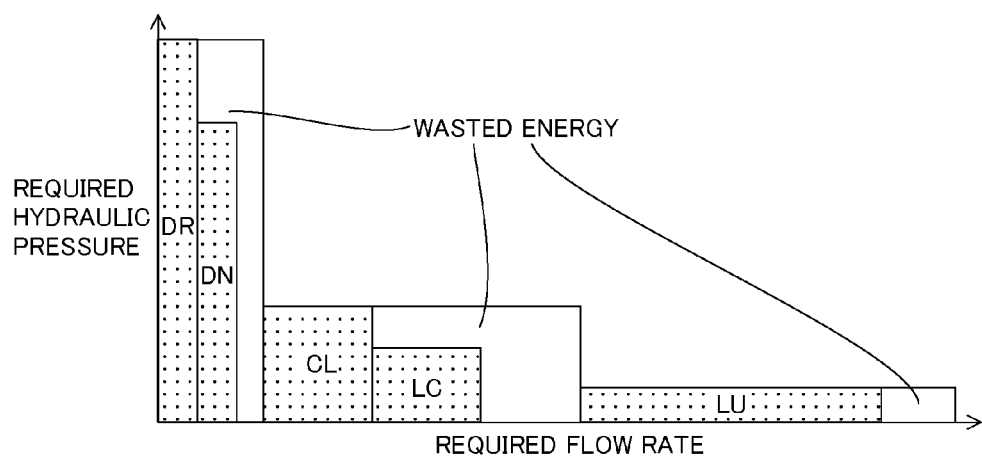
FIG. 7 is an explanatory view showing energy loss characteristics of the hydraulic pressure supply mechanism shown in FIG. 6.

FIG. 6 is a schematic diagram showing the essentials of a hydraulic pressure supply mechanism of a hydraulic pressure supply apparatus for an automatic transmission according to a third embodiment, and FIG. 7 is an explanatory view showing energy loss characteristics of the hydraulic pressure supply mechanism.

Focusing explanation on the points of difference from the first embodiment, the third embodiment is configured to have the hydraulic pumps 42 the same five fixed-delivery pumps 42a, 42b, 42c, 42d and 42e as the first embodiment but to reduce the number of regulator valves 44 from five to three, namely regulator valve (P1) 44f, regulator valve (P2) 44g and regulator valve (P3) 44h.

Namely, the five required hydraulic pressures DR, DN, CL, LC, LU of the hydraulic pressure supply destinations are grouped into three groups, and the embodiment is configured with three regulator valves 44 and five hydraulic pumps 42.

Specifically, as shown in FIG. 6, the configuration places DR and DN in Group 1 and hydraulic oil regulated by the Group 1 regulator valve (P1) 44f is dividedly supplied by the selector valves 46 to oil passages that let it through as is and oil passages that reduce its pressure.

Further, CL and LC are placed in Group 2 and hydraulic oil regulated by the Group 2 regulator valve (P2) 44g is dividedly supplied by the selector valves 46 to oil passages that let it through as is and oil passages that reduce its pressure, while LU of the remaining lubrication system 48 is designated as Group 3 and supplied with hydraulic oil regulated by the Group 3 regulator valve (P3) 44h.

Although as shown in FIG. 7, the aforesaid configuration of the hydraulic pressure supply apparatus for an automatic transmission according to the third embodiment results in more lost energy than in the first embodiment shown in FIG. 3, it enables simplification of the control algorithm because the levels of the required hydraulic pressures at the time of selecting the hydraulic pumps 42 are reduced from five types to three types.

Moreover, the configuration broadly divides the hydraulic pressure supply destinations into at least Group 1 comprising the drive/driven pulleys 26a, 26b of the CVT 26, Group 2 comprising the forward clutch 28a of the forward-reverse switching mechanism 28 and the lock-up clutch 24c of the torque converter 24, and Group 3 comprising the lubrication system 48 of the CVT 26, whereby the hydraulic pressures can be regulated in three broadly divided systems, namely, as stated above, at least a clutch system medium-pressure system covering the lock-up clutch 24c/forward clutch 28a, a high-pressure system covering the drive/driven pulleys 26a, 26b, and a low-pressure system covering the lubrication system 48, thus enabling further energy efficiency improvement by reducing needless work of the hydraulic pumps 42, as well as optimization of the number of components.

Further, the reduction of the number of the levels of the required hydraulic pressures at the time of selecting the hydraulic pumps 42 from five types to three types makes it possible both to simplify the control algorithm and to reduce the number of required hydraulic pressure types. Other aspects of the configuration and the effects are no different from those of the first embodiment.

FIG. 8 is an explanatory diagram showing the operation of a hydraulic pressure supply mechanism of a hydraulic pressure supply apparatus for an automatic transmission according to a fourth embodiment.

The fourth embodiment is a modification of the third embodiment, which differs from the third embodiment in being configured so that the delivery capacities of the hydraulic pumps 42 are represented by multiplying a predetermined unit (e.g., 1 (liter)) by an integer composed of a prime number. In other words, the configuration is such that where the required pump delivery capacity in FIG. 6 is 18 [1], the integers for the five hydraulic pumps 42 are 1 [1] for the first hydraulic pump (Q1) 42a2, 2 [1] for the second hydraulic pump (Q2) 42b2, 3 [1] for the third hydraulic pump (Q3) 42c2, 5 [1] for the fourth hydraulic pump (Q4) 42d2, and 7 [1] for the fifth hydraulic pump (Q5) 42e2.

As shown in FIG. 8 regarding the selection of the hydraulic pumps 42, where, for example, a delivery capacity of 18 [1] is required, all of the hydraulic pumps 42 are operated, whereafter the number and combination of the hydraulic pumps 42 selected is differentiated accordingly as the required delivery capacity declines. As can be seen from FIG. 8, these five numerical values can be selectively combined to satisfy all values 1-18 [1] (total delivery capacity of the five hydraulic pumps 42) by combining the delivery capacities of the five hydraulic pumps.

In the fourth embodiment, the selector valves 46 connect the hydraulic pumps 42 and regulator valves 44 as indicated, for example, by broken lines in FIG. 2. Specifically, the first hydraulic pump 42a2 is connected to the regulator valve (P1) 44f, the second and third hydraulic pumps 42b2, 42c2 to the regulator valve (P2) 44g, and the fourth hydraulic pump 42d2 to the regulator valve (P3) 44h, and the fifth hydraulic pump 42e2 is connected to a drain port.

Owing to the aforesaid configuration, the hydraulic pressure supply apparatus for an automatic transmission according to the fourth embodiment can enhance energy efficiency by minimizing the number of the hydraulic pumps 42 that need to be operated once the required flow rate is determined at each required hydraulic pressure. Other aspects of the configuration and the effects are no different from those of the first embodiment.

Figure 9:
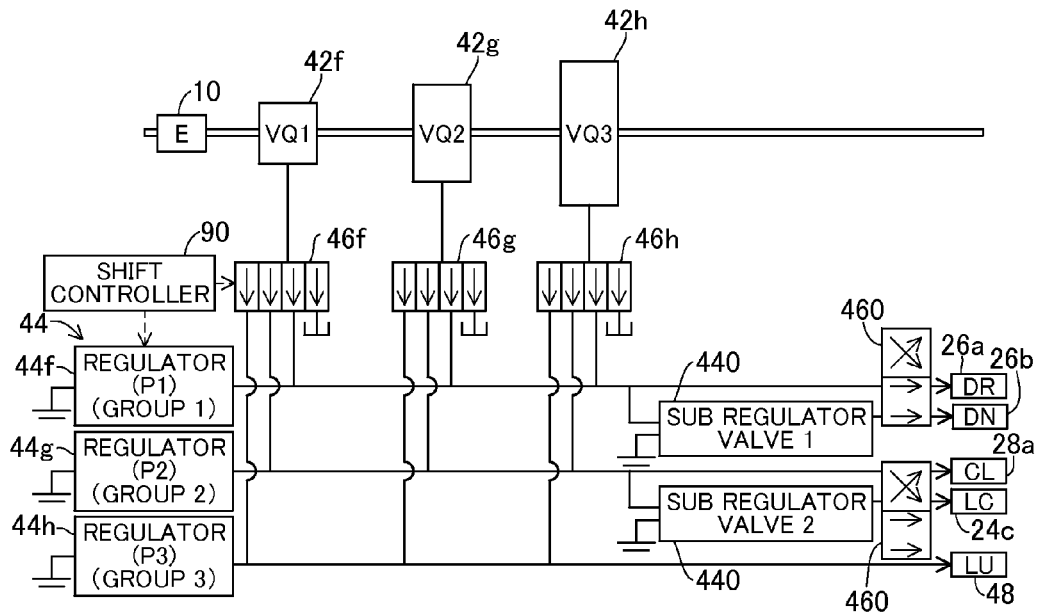
FIG. 9 is a schematic diagram showing an overall view of a hydraulic pressure supply mechanism of a hydraulic pressure supply apparatus for an automatic transmission according to a fifth embodiment.
Figure 10:
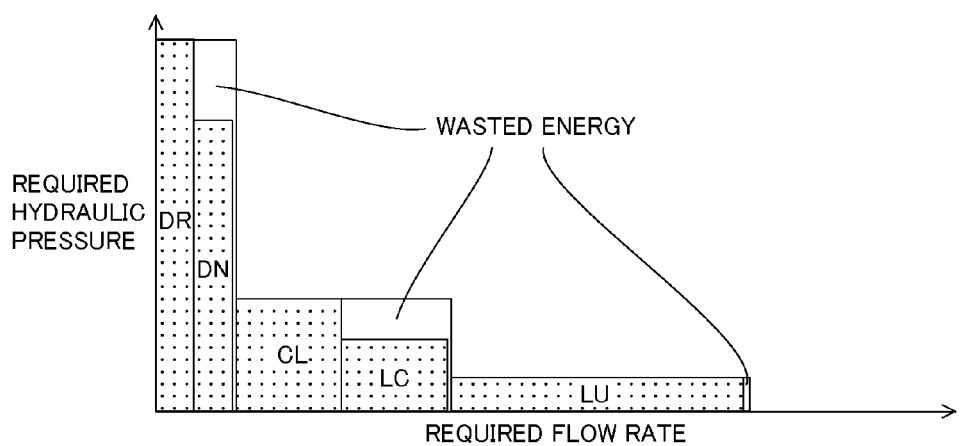
FIG. 10 is an explanatory diagram showing energy loss characteristics of the hydraulic pressure supply mechanism shown in FIG. 9.

FIG. 9 is a schematic diagram showing an overall view of a hydraulic pressure supply mechanism of a hydraulic pressure supply apparatus for an automatic transmission according to a fifth embodiment, and FIG. 10 is an explanatory diagram showing energy loss characteristics of the hydraulic pressure supply mechanism.

Like the third embodiment, the fifth embodiment is configured to group the five hydraulic pressure supply destinations into three groups, namely, Group 1 to Group 3, reduce the number of regulator valves 44 to three, namely, a regulator valve (P1) 44f, regulator valve (P2) 44g and regulator valve (P3) 44h, and also reduce the number of hydraulic pumps 42 to three, namely, a first hydraulic pump 42f, second hydraulic pump 42g and third hydraulic pump 42h, all of which are variable delivery pumps.

Moreover, Groups 1 and 2 comprising the regulator valve (P1) 44f and regulator valve (P2) 44g are both configured to comprise a sub (second) regulator valve 440 and a sub (second) selector valve 460.

The sub-regulator valves 440 further reduce part of the hydraulic pressure arriving from the regulator valves 44, and each of the sub-selector valves 460 supplies the reduced hydraulic pressures to one of the hydraulic actuators, i.e., to the drive pulley 26a or driven pulley 26b and to the forward clutch 28a or lock-up clutch 24c.

Although, as shown in FIG. 10, the aforesaid configuration of the fifth embodiment results in more lost energy than in the second embodiment, it enables simplification of the control algorithm because it can suffice with only three regulator valves 44 and therefore reduces the number of required hydraulic pressure levels at the time of selecting the hydraulic pumps 42. Moreover, flow rates can be generated that are substantially equal to the total required flow rates of the respective groups, so that lost energy can be reduced.

Further, the configuration provides some of Groups 1 to 3, specifically, Groups 1 and 2, with the sub (second) regulator valves 440 and sub (second) selector valves 460, so that in addition to realizing the aforesaid effects, energy efficiency can be enhanced by individually re-regulating the hydraulic pressures and flow rates of Groups 1 to 3. Other aspects of the configuration and the effects are no different from those of the first embodiment.

Figure 11:
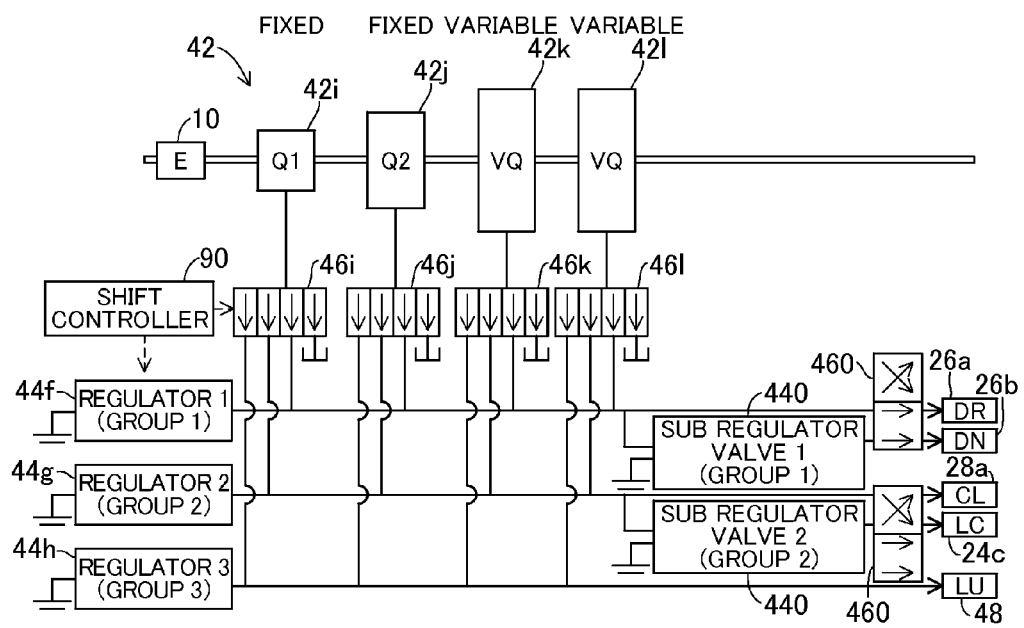
FIG. 11 is a schematic diagram showing an overall view of a hydraulic pressure supply mechanism of a hydraulic pressure supply apparatus for an automatic transmission according to a sixth embodiment.
Figure 12:
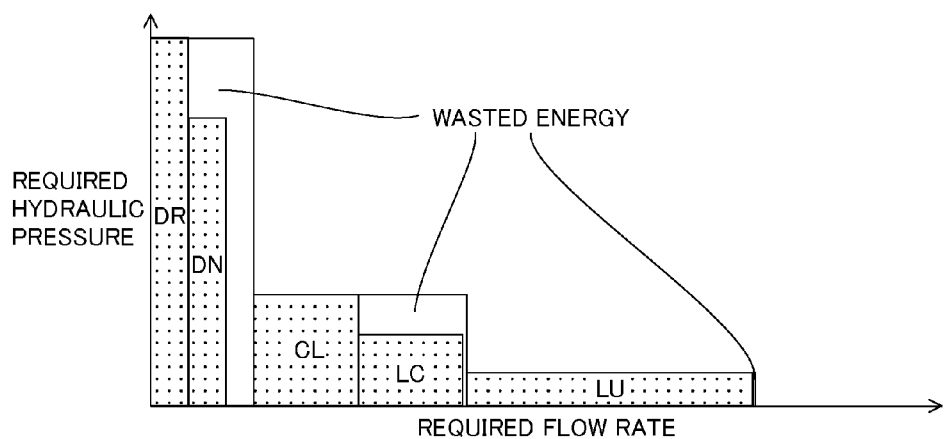
FIG. 12 is an explanatory diagram showing energy loss characteristics of the hydraulic pressure supply mechanism shown in FIG. 11.

FIG. 11 is a schematic diagram showing an overall view of a hydraulic pressure supply mechanism of a hydraulic pressure supply apparatus for an automatic transmission according to a sixth embodiment, and FIG. 12 is an explanatory diagram showing energy loss characteristics of the hydraulic pressure supply mechanism.

Like the third embodiment, the sixth embodiment is configured to group the five hydraulic pressure supply destinations into three groups, namely, Group 1 to Group 3, to reduce the number of regulator valves 44 to three, and to comprise as the hydraulic pumps 42 two fixed-delivery pumps 42i, 42j and two variable delivery pumps 42k, 42l. Further, the configuration defines the number of selector valves 46 as four, namely, first to fourth selector valves 46i, 46j, 46k, 46l.

As shown in FIG. 12, lost energy is lower in the sixth embodiment than in the third embodiment, and lost energy is markedly reduced because the two variable delivery pumps 42k, 42l suffice and flow rates can be generated that are substantially equal to the total required flow rates of Groups 2 and 3 even if the fixed-delivery pumps 42i, 42j output greater than necessary flow rates to Group 1.

In addition, the withstand pressures of the variable delivery pumps 42k, 42l can be lowered in the case of separately utilizing the fixed-delivery pumps 42i, 42j for Group 1 requiring high pressure and the variable delivery pumps 42k, 42l for Groups 2 and 3 requiring only medium and low pressures, and since this in turn makes it possible to expand the fit tolerance range, the cost of the variable delivery pumps 42k, 42l can be reduced by restricting the hydraulic pumps 42 used group by group. Other aspects of the configuration and the effects are no different from those of the first embodiment.

As set forth in the foregoing, the first to sixth embodiments are configured to have a hydraulic pressure supply apparatus for an automatic transmission (CVT 26) having hydraulic pressure supply destinations comprising at least three hydraulic actuators (in the embodiments, four hydraulic actuators (namely, the drive/driven pulleys 26a, 26b, forward clutch 28a (and reverse brake-clutch 28b), and lock-up clutch 24c) different from one another in required hydraulic pressure (DR, DN, CL, LC) and a lubrication system (48: LU), comprising at least three hydraulic pumps (42, 42a, 42a1, 42a2, 42b, 42b1, 42b2, 42c, 42c1, 42c2, 42d, 42d1, 42d2, 42e, 42e1, 42e2, 42f, 42g, 42h, 42i, 42j, 42k, 42l) connected to a prime mover (engine 10) and installed in oil passages connecting the hydraulic pressure supply destinations, namely, the four hydraulic actuators of the automatic transmission and the lubrication system (48), and a reservoir (50), to pump hydraulic oil from the reservoir (50) and deliver it to the oil passages when driven by the prime mover (10); at least three regulator valves (regulators 44, 44a, 44b, 44c, 44d, 44e, 44f, 44g, 44h) installed in the oil passages to be capable of regulating the hydraulic pressures delivered from the hydraulic pumps to values corresponding to the respective required hydraulic pressures and delivering them to the hydraulic pressure supply destinations; selector valves (46, 46a, 46a1, 46b, 46b1, 46c, 46c1, 46d, 46d1, 46e, 46e1, 46f, 46g, 46h, 46i, 46j, 46k, 46l) installed in the oil passages at locations between the hydraulic pumps and regulator valves; and a controller (shift controller 90) that controls operation of the selector valves so as to connect the hydraulic pumps to the regulator valves in accordance with the required flow rates of the hydraulic pressure supply destinations.

This configuration enables the required hydraulic pressures to be independently regulated by the associated regulator valves 44, whereby wasted hydraulic pressure energy can be minimized to the utmost to realize enhanced energy efficiency even in the case where the at least three hydraulic actuators different from one another in required hydraulic pressure are installed.

Specifically, in the apparatus, the controller (shift controller 90) controls operation of the selector valves (46) so as to connect the hydraulic pumps (42) to the regulator valves (44) by determining the pump to be assigned to the destination requiring a highest flow rate, and then by determining the pumps to be assigned to the destinations consecutively requiring a next highest flow rate.

Further, in the apparatus, the hydraulic pumps (42) comprise fixed-delivery pumps (42, 42a, 42a2, 42b, 42b2, 42c, 42c2, 42d, 42d2, 42e, 42e2, 42i, 42j) that are different from one another in delivery capacity, whereby energy efficiency can be further improved by suitably operating the multiple hydraulic pumps 42 and suitably determining the number of hydraulic pumps 42 for the hydraulic actuators whose required flow rates for the respective hydraulic pressures are determined beforehand. Concomitantly, energy loss attributable to recirculation to the inlets of the hydraulic pumps 42 and pressure reduction/dumping at the regulator valves 44 can be held to the minimum.

To be more specific, in the apparatus, the fix-delivery pumps (42) are communicated with all of the regulator valves (44) through the selector valves (46) to establish mutually different capacities, whereby enabling the five hydraulic pumps 42 to be communicated with appropriate regulator valves 44 in suitable numbers that need to be operated when the required flow rates for the respective hydraulic pressures have been determined, thereby further improving energy efficiency. Concomitantly, energy loss attributable to recirculation to the inlets of the hydraulic pumps 42 and pressure reduction/dumping at the regulator valves 44 can be held to the minimum.

Moreover, in the apparatus, the delivery capacities of the hydraulic pumps (42a2, 42b2, 42c2, 42d2, 42e2) are represented by multiplying a predetermined unit by an integer composed of a prime number. With this, in addition to realizing the aforesaid effects, energy efficiency can be further improved because the number of the hydraulic pumps 42 for the hydraulic actuators whose required flow rates for the respective hydraulic pressures are determined beforehand can be reduced to the minimum necessary.

Further, in the apparatus, the hydraulic pumps (42) comprise variable delivery pumps (42a1, 42b1, 42c1, 42d1, 42e1, 42f, 42g, 42h, 42k, 42l), whereby the multiple hydraulic pumps 42 can be still more suitably operated to generate the minimum required flow rates with respect to the respective required hydraulic pressures, thereby enabling further improvement of energy efficiency.

Further, the apparatus further includes: sub regulator valves (440) installed in the oil passages at locations downstream of the regulator valves (44) to be capable of additionally regulating the hydraulic pressures to be delivered to the hydraulic pressure supply destinations, so that in addition to realizing the aforesaid effects, energy efficiency can be enhanced by individually re-regulating the hydraulic pressures and flow rates of Groups 1 to 3.

Further, in the apparatus, a number of the hydraulic pumps (42) is the same as the number of the regulator valves (44), so that the hydraulic pumps 42 generate only the minimum required flow rates with respect to the hydraulic pressure supply destinations, i.e., they can operated to do only minimal work, and weight and cost reduction can be achieved by decreasing the number of the hydraulic pumps 42.

Further, in the apparatus, the hydraulic pumps (42) comprise fixed-delivery pumps (42i, 42j) and variable delivery pumps (42k, 42l). With this, the withstand pressures of the variable delivery pumps 42k, 42l can be lowered in the case of separately utilizing the fixed-delivery pumps 42i, 42j for Group 1 requiring high pressure and the variable delivery pumps 42k, 42l for Groups 2 and 3 requiring only medium and low pressures, and since this in turn makes it possible to expand the fit tolerance range, the cost of the variable delivery pumps 42k, 42l can be reduced by restricting the hydraulic pumps 42 used group by group.

Moreover, in the apparatus, the automatic transmission comprises a continuously variable transmission (CVT 26) connected to the prime mover (engine 10) through a torque converter (24) and connected to drive wheels (12) through a forward-reverse switching mechanism (28), while the hydraulic pressure supply destinations are constituted by at least drive/driven pulleys (26a, 26b) of the continuously variable transmission (26), forward clutch (28a) of the forward-reverse switching mechanism (28), lock-up clutch (24c) of the torque converter (24), and the lubrication system (48), whereby, even in the case where the automatic transmission includes the torque converter 24 and forward-reverse switching mechanism 28 and needs to ensure hydraulic flow rates for at least five systems including at least the lock-up clutch 24c, forward clutch 28a, drive/driven pulleys 26a, 26b, and lubrication system 48, it is nevertheless possible by regulating the hydraulic pressures and flow rates of the individual systems to reduce unnecessary work of the hydraulic pumps 42 and thereby upgrade energy efficiency.

Further, in the apparatus, the hydraulic pressure supply destinations are divided into at least three groups made up of a first group (Group 1) comprising the drive/driven pulleys (26a, 26b) of the continuously variable transmission (26), a second group (Group 2) comprising the forward clutch (28a) of the forward-reverse switching mechanism (28) and the lock-up clutch (24c) of the torque converter (24), and a third group (Group 3) comprising the lubrication system (48), whereby the hydraulic pressures can be regulated in three broadly divided systems, namely, as stated above, at least a clutch system medium-pressure system covering the lock-up clutch/forward clutch, a high-pressure system covering the drive/driven pulleys, and a low-pressure system covering the lubrication system, thus enabling further energy efficiency improvement by reducing needless work of the hydraulic pumps 42, as well as optimization of the number of components.

Although various configurations extending from the first to sixth embodiments are disclosed in the foregoing, these can, needless to say, be variously modified by, for example, addition or omission of constituents. For example, the configuration of the fourth embodiment shown in FIG. 8 can be modified by incorporating the sub-regulator valve 440 and sub-selector valve 460 constituting part of the configuration of the fifth embodiment shown in FIG. 10.

Japanese Patent Application No. 2012-280148 filed on Dec. 21, 2012, is incorporated by reference herein in its entirety.

While the embodiments have thus been shown and described with reference to specific embodiments, it should be noted that the embodiments are in no way limited to the details of the described arrangements; changes and modifications may be made without departing from the scope of the appended claims.

What is claimed is:

1. A hydraulic pressure supply apparatus for an automatic transmission having hydraulic pressure supply destinations comprising at least three hydraulic actuators different from one another in required hydraulic pressure and a lubrication system, comprising:
    at least three hydraulic pumps connected to a prime mover and installed in oil passages connecting the hydraulic pressure supply destinations and a reservoir, to pump hydraulic oil from the reservoir and deliver it to the oil passages when driven by the prime mover;
    at least three regulator valves installed in the oil passages to be capable of regulating the hydraulic pressures delivered from the hydraulic pumps to values corresponding to the respective required hydraulic pressures and delivering them to the hydraulic pressure supply destinations;
    selector valves installed in the oil passages at locations between the hydraulic pumps and regulator valves; and
    a controller that controls operation of the selector valves so as to connect the hydraulic pumps to the regulator valves in accordance with required flow rates of the hydraulic pressure supply destinations.

2. The apparatus according to claim 1, wherein the controller controls the operation of the selector valves so as to connect the hydraulic pumps to the regulator valves by determining the pump to be assigned to the destination requiring a highest flow rate, and then by determining the pumps to be assigned to the destinations consecutively requiring a next highest flow rate.

3. The apparatus according to claim 1, wherein the hydraulic pumps comprise fixed-delivery pumps that are different from one another in delivery capacity.

4. The apparatus according to claim 3, wherein the fix-delivery pumps are communicated with all of the regulator valves through the selector valves to establish mutually different capacities.

5. The apparatus according to claim 3, wherein the delivery capacities of the hydraulic pumps are represented by multiplying a predetermined unit by an integer composed of a prime number.

6. The apparatus according to claim 1, wherein the hydraulic pumps comprise variable delivery pumps.

7. The apparatus according to claim 6, further including:
    sub regulator valves installed in the oil passages at locations downstream of the regulator valves to be capable of additionally regulating the hydraulic pressures to be delivered to the hydraulic pressure supply destinations.

8. The apparatus according to claim 1, wherein a number of the hydraulic pumps is the same as the number of the regulator valves.

9. The apparatus according to claim 1, wherein the hydraulic pumps comprise fixed-delivery pumps and variable delivery pumps.

10. The apparatus according to claim 1, wherein the automatic transmission comprises a continuously variable transmission connected to the prime mover through a torque converter and connected to drive wheels through a forward-reverse switching mechanism, while the hydraulic pressure supply destinations are constituted by at least drive/driven pulleys of the continuously variable transmission, a forward clutch of the forward-reverse switching mechanism, a lock-up clutch of the torque converter, and the lubrication system.

11. The apparatus according to claim 10, wherein the hydraulic pressure supply destinations are divided into at least three groups made up of a first group comprising the drive/driven pulleys of the continuously variable transmission, a second group comprising the forward clutch of the forward-reverse switching mechanism and the lock-up clutch of the torque converter, and a third group comprising the lubrication system.

* * * * *